(12) United States Patent
Raynor et al.

(10) Patent No.: US 9,310,247 B2
(45) Date of Patent: Apr. 12, 2016

(54) DARK CURRENT CALIBRATION FOR A PHOTOSENSITIVE DEVICE

(71) Applicant: STMicroelectronics (Research & Development) Limited, Marlow, Buckinghamshire (GB)

(72) Inventors: Jeffrey M. Raynor, Edinburgh (GB); Andy Price, Bonnyrigg (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 36 days.

(21) Appl. No.: 14/287,445

(22) Filed: May 27, 2014

(65) Prior Publication Data

US 2014/0353471 A1     Dec. 4, 2014

(30) Foreign Application Priority Data

May 29, 2013   (GB) .................................. 1309568.2

(51) Int. Cl.
*G01J 1/44*    (2006.01)
*G01J 1/16*    (2006.01)

(52) U.S. Cl.
CPC ................ *G01J 1/1626* (2013.01); *G01J 1/44* (2013.01); *G01J 2001/444* (2013.01)

(58) Field of Classification Search
CPC ........................... H04N 5/361; G01J 2001/444
USPC ....................................... 250/214 C
See application file for complete search history.

(56) References Cited

U.S. PATENT DOCUMENTS

| | | | |
|---|---|---|---|
| 6,614,562 B1 | 9/2003 | Minemier | |
| 6,974,973 B2 * | 12/2005 | Rossi | ..................... H04N 5/361 257/222 |
| 7,235,773 B1 | 6/2007 | Newman | |
| 2004/0051796 A1 | 3/2004 | Kelly et al. | |
| 2007/0273775 A1 * | 11/2007 | Jiang | ..................... H04N 5/361 348/244 |
| 2008/0075349 A1 | 3/2008 | Ritter et al. | |

* cited by examiner

*Primary Examiner* — Thanh Luu
(74) *Attorney, Agent, or Firm* — Gardere Wynne Sewell LLP (57) ABSTRACT

An imaging circuit includes at least one photosensitive device that provides an output in response to at least one photon and a compensation circuit configured to provide dark current compensation for the output of said photosensitive device. The applied compensation uses temperature information and temperature dependent calibration information.

25 Claims, 5 Drawing Sheets

DARK CURRENT CALIBRATION FOR A PHOTOSENSITIVE DEVICE

PRIORITY CLAIM

This application claims priority from United Kingdom Application for Patent No. 1309568.2 filed May 29, 2013, the disclosure of which is incorporated by reference.

TECHNICAL FIELD

Some embodiments relate to methods and apparatus and in particular but not exclusively to image sensor methods and apparatus.

BACKGROUND

Solid state image sensors fabricated from semiconductor materials are known. Some image sensors may be produced using CMOS processing technologies.

An image sensor comprises at least one sensor and associated circuitry for controlling the operation of the image sensor and for manipulation of the signals that are output from the image sensor.

An image sensor may comprise one or more pixels. Each pixel comprises a photodiode which may be formed as a doped region within a semiconductor substrate. The energy of incident photons removes electrons from the outer orbits of atoms within the photosensitive portion thus generating a charge. The pixel also comprises readout circuitry.

The photodiode makes use of an electric field at a P-N junction to cause the photo generated electron to move away from the ion and prevent re-combination and loss of the signal. However, these P-N junctions have a small leakage current which the photodiode cannot distinguish from a current which is generated by light. This leakage current is present in the dark, and so this leakage current is commonly known as dark current. The term "dark" is understood to be a condition where light is either absent, or where light that is incident on the image sensor does not cause the photo generation of charge by the photodiode. This can either be because the photodiode is shielded, or because it is held at a potential, for example a reset potential, that prevents the accumulation of charge at the photodiode.

This dark current may be a limiting factor in the performance characteristics of photodiodes. Dark current is temperature dependent. Dark current may also be dependent on impurities in the silicon of the photodiode. Dark current may vary with any non-uniformity in doping gradients across the die or non-uniformity introduced by etching variations.

SUMMARY

According to an aspect, there is provided an arrangement comprising: at least one photosensitive device for providing an output in response to at least one photon; and a compensation arrangement configured to provide dark current compensation for the output of said photosensitive device, said compensation arrangement using temperature information and temperature dependent calibration information.

The compensation arrangement may comprise at least one shielded compensation photosensitive device.

The at least one shielded photosensitive device may be configured in use to provide a dark current value.

The compensation arrangement may be configured in use to modify said dark current value of said at least one shielded photosensitive device to provide a temperature compensated dark current value.

The compensation arrangement may be configured to use said temperature compensated dark current value as a measure of dark current in said output of said at least one photosensitive device.

The compensation arrangement may be configured to subtract said temperature compensated dark current value from said output of said at least one photosensitive device.

The calibration information may be dependent on calibration at at least two different calibration temperatures.

The calibration information may be dependent on a dark current of said at least one shielded photosensitive device and/or dark current of said at least one photosensitive device for at least two different calibration temperatures.

The compensation arrangement may be configured to apply a function to a dark current value of said shielded photosensitive device, said function being dependent on said temperature information and said dark current of said at least one shielded photosensitive device and dark current of said at least one photosensitive device at at least two different calibration temperatures.

The function may have a first factor dependent on a first coefficient multiplied by an exponential function of the temperature information divided by a second coefficient.

At least one of said first and second coefficients may be dependent on a dark current at said two different calibration values for said shielded photosensitive device and a dark current at said two different calibration values for said photosensitive device The compensation arrangement may be configured to store said first and second coefficients.

The compensation arrangement may comprise a data store configured to store said function.

The compensation arrangement may comprise a processor configured to execute said function.

At least one calibration temperature may be in a range of 10 degrees to 30 degrees.

At least one calibration temperature may be in a range of 70 degrees to 90 degrees.

The compensation arrangement may comprise a comprising a temperature sensing device.

The temperature sensing device may comprise a proportional to absolute temperature sensor.

The photosensitive device may comprise a photodiode.

An apparatus may provide said arrangement.

An integrated circuit may comprise any of the previously discussed arrangements.

An image sensor may comprise any of the previously discussed arrangements.

An x-ray sensor may comprise any of the previously discussed arrangements.

According to another aspect, there is provided a method comprising: providing dark current compensation for an output of a photosensitive device, said compensation comprising using temperature information and temperature dependent calibration information.

The method may comprise obtaining a dark current value for at at least one shielded compensation photosensitive device, said compensation using said dark current value.

The method may comprise modifying said dark current value of said at least one shielded photosensitive device to provide a temperature compensated dark current value.

The method may comprise using said temperature compensated dark current value as a measure of dark current in said output of said at least one photosensitive device.

The method may comprise subtracting said temperature compensated dark current value from said output of said at least one photosensitive device.

The calibration information may be dependent on calibration for at least two different calibration temperatures.

The calibration information may be dependent on a dark current of said at least one shielded photosensitive device and/or dark current of said at least one photosensitive device at at least two different calibration temperatures.

The compensation arrangement may be configured to apply a function to a dark current value of said shielded photosensitive device, said function being dependent on said temperature information and said dark current of said at least one shielded photosensitive device and dark current of said at least one photosensitive device at at least two different calibration temperatures.

The function may have a first factor dependent on a first coefficient multiplied by an exponential function of the temperature information divided by a second coefficient.

At least one of said first and second coefficients may be dependent on a dark current at said two different calibration values for said shielded photosensitive device and a dark current at said two different calibration values for said photosensitive device The method may comprise storing said first and second coefficients.

At least one calibration temperature may be in a range of 10 degrees to 30 degrees.

At least one calibration temperature may be in a range of 70 degrees to 90 degrees.

BRIEF DESCRIPTION OF THE DRAWINGS

Some embodiments will now be described by way of example only and with reference to the accompanying Figures in which.

DETAILED DESCRIPTION OF THE DRAWINGS

Some photo-detection systems do not require an absolute level of the amount of brightness. In some systems only information indicating which part of a scene is brighter than other parts of the scene may be provided. By way of example such systems may be megapixel cameras. However, some photo-detection systems need to provide an absolute measurement of the photon flux rate. For example, some systems need to provide an ambient light level.

At low light levels, the dark-current of the photo-detector (Idark) becomes dominant and the dark current determines the minimum detectable light level. Typically, the ambient light can be transmitted relatively un-hindered to the photo-detector and is dominant even at low light levels, e.g. <10 Lux. However, having an un-hindered transmission path to the ambient light sensor (ALS) may mean that the ALS is visible to the end user. In some applications, it is sometimes necessary that the ALS is not visible to the end user. This may be for cosmetic reasons and/or may be required for protection. Accordingly in some applications, the ALS may be hidden by using a dark paint or smoked glass applied to the housing containing the ALS. This may result in optical filtering being applied to the ALS. This may greatly restrict the amount of light transmitted. In some situations this may reduce the light to for example <1% of the light.

While the ALS may be successfully hidden from the end user, there may be considerably less light on the sensor. Thus, in some embodiments, the minimum detection limit of ambient light (i.e. above the sensor) is now 100× than that without the dark paint.

For an ALS to operate acceptably in these situations, it may be required to reduce the effective dark current in the system.

Figure 1:
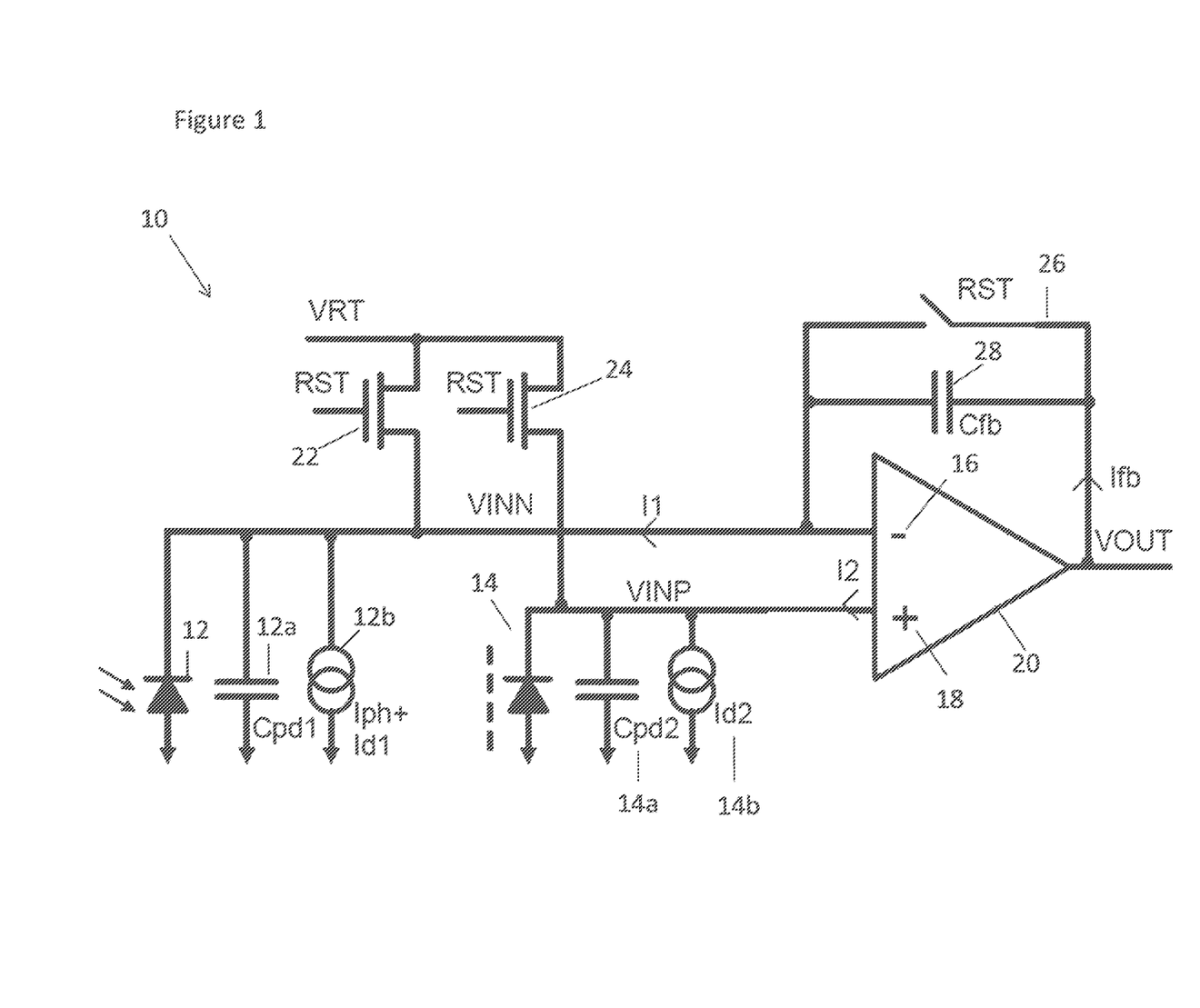
FIG. 1 shows a first dark current compensating arrangement which uses analog compensation.

Reference is made to FIG. 1 which shows a first technique. This technique uses two photodiodes for each pixel. One is sensitive to light and one is shielded from light. The method is used to subtract the current in the analog domain so that the output is/should be free from dark current.

In the arrangement of FIG. 1, a pixel 10 comprises a first photodiode 12 and a second photodiode 14. The photodiodes 12 and 14 have been modeled showing their intrinsic capacitances Cpd1 (12a), Cpd2 (14a) and current sources 12b, 14b. The first photodiode 12 and the second photodiode 14 provide respective inverting and non-inverting inputs 16, 18 to an operational amplifier 20. The first photodiode 12 is light sensitive in a normal fashion while the second photodiode 14 is shielded from incident light. The output from the second photodiode 14 therefore represents a dark current.

Each photodiode 12, 14 is connected to a reset voltage VRT via NMOS switches 22, 24. A reset switch 26 is also provided across the feedback capacitor 28 of the operational amplifier 20. The reset switch is selectively operable to discharge the operational amplifier 20.

For the first photodiode 12 the current source is Iph+Id1 where Iph is the photo current and Id1 is the dark current through the photodiode. For the second photodiode 14 the current source comprises only Id2, i.e. the dark current through the second photodiode 14.

Assuming the system has been reset, dark current will cause the voltage on VINP to decay:

$$VINP = VRT - Id2 * [delta]t/Cpd2 \quad (1)$$

The operational amplifier offers high impedance, and so no current flows into its input. Hence $$QCfb = (Id1 + Iph)[delta]t \quad (2)$$

Hence the voltage at the output of the op-amp, $$VOUT = VINN + Qcfb/Cfb. \quad (3)$$

Due to the negative feedback operation of the op-amp, VINN=VINP and so:

$$VOUT = VINP + QCfb/Cfb \quad (4)$$

Substituting Equation 1 and Equation 2 into Equation 4, gives $$VOUT = VRT + Iph*[delta]t/Cfb + (Id1/Cfb - Id2/Cpd2)*[delta]t \quad (5)$$

From Equation 5, it can be seen that as a general case, the effect of dark current can be cancelled in the output voltage if:

$$Id1/Cfb = Id2/Cpd2 \quad (6)$$

In general dark current will be cancelled when the ratio of the dark current in the first photodiode 12 to the feedback capacitance 28 of the operational amplifier 20 is equal to the ratio of the dark current in the second photodiode 14 to the intrinsic capacitance 14a of that photodiode 14.

However, the arrangement of FIG. 1 makes the assumption that the two diodes variation of Idark with temperature is the same. However, this is generally not the case. Different types of impurities in the silicon may produce dark currents which vary at different temperatures and the arrangement of FIG. 1 does not compensate for this.

Figure 2:
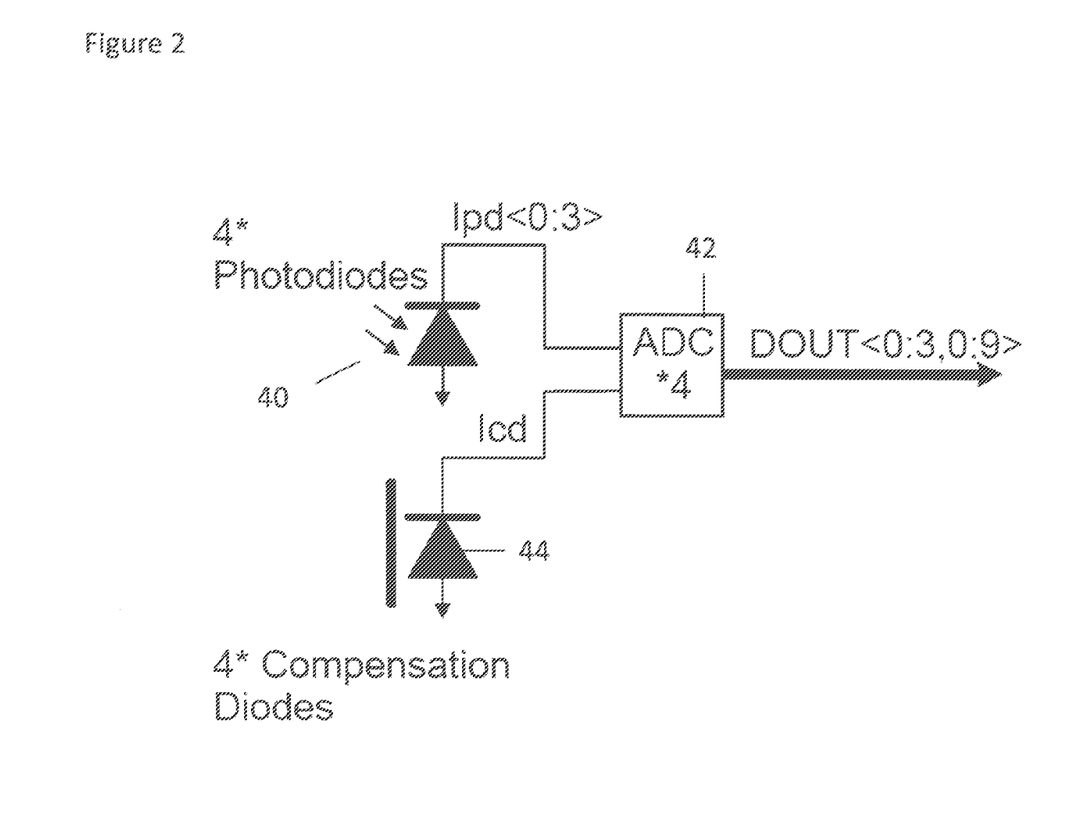
FIG. 2 shows a second dark current compensating arrangement which uses digital compensation.

FIG. 2 shows a block diagram of part of an image sensor architecture. This arrangement has dark current subtraction in the digital domain. This contrasts with the arrangement of FIG. 1 where there is dark current subtraction in the analog domain.

In FIG. 2, four photodiodes 40 are represented and correspond to the photodiodes 12 and four compensation photodiodes 44 are represented and correspond to the photodiodes 14. Analog to digital circuitry 42 is also provided. The ADC provides digital subtraction of the dark current from the sensing diode outputs.

It should be appreciated that different diodes will have different dark currents at the same temperature. Likewise those different diodes will have different behavior from one another as the temperature is increased.

Dark current may be strongly temperature dependent. One approximation is that dark current doubles every 8° C.

The temperature at which the Idark doubles may be dependent on the impurities.

$$I\text{dark}=r\times\exp(T/d) \quad (7)$$

Equation 7 describes the dark current as a function of temperature. The co-efficient "r" sets the level of Idark at a particular temperature (e.g. 20° C.) and the co-efficient "d" the "doubling rate", i.e. how the dark current increases with temperature "T" of the diode.

In some embodiments, it is preferable to calibrate the device at higher temperatures, where Idark is higher. By way of example this higher temperature may be around 80° C. It should be appreciated that other temperatures can be used for the higher temperature. This is can be done by heating the system to 80° C., measuring the dark current from the two diodes (photosensitive and shielded) and calculating a scaling factor "GC":

$$I\text{out}=I\text{photo}-GC\times I\text{shielded} \quad (8)$$

Iphoto is the output of the unshielded photodiode and the Ishielded is the output of the shielded or calibration diode.

Figure 3:
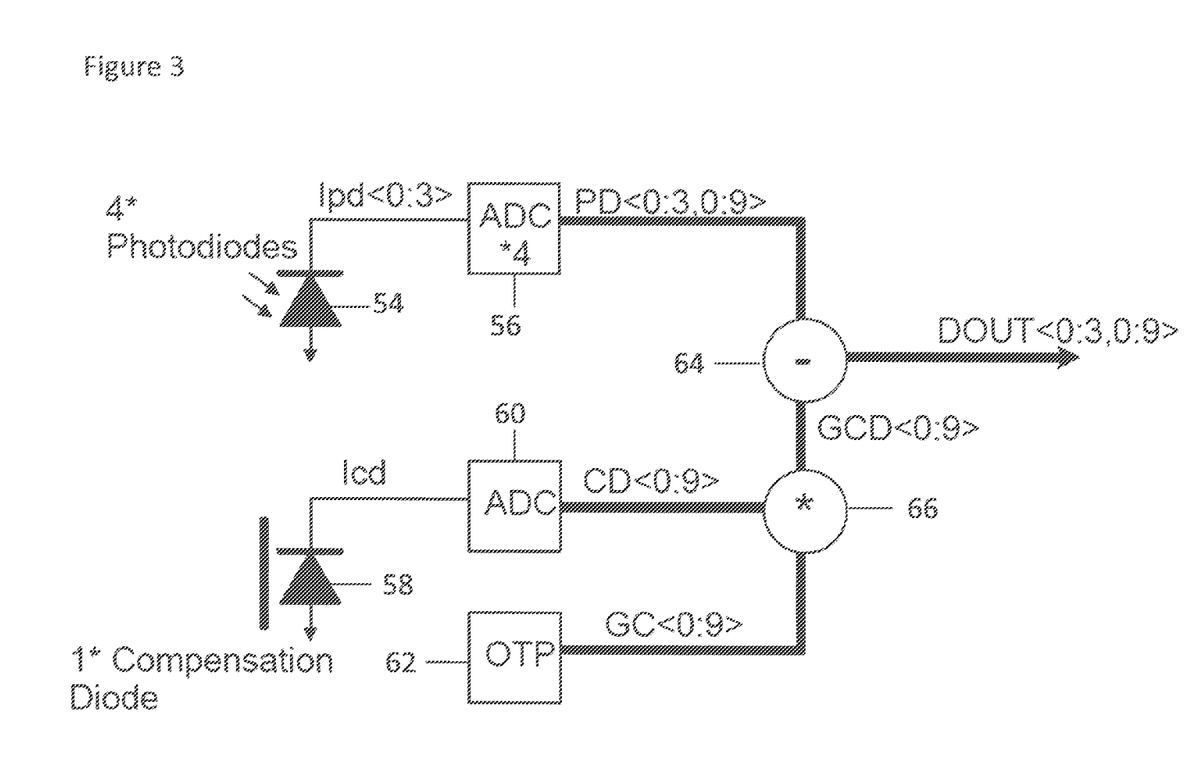
FIG. 3 shows an arrangement for dark current cancellation with no temperature sensor.

Reference is made to FIG. 3 which schematically shows an arrangement with dark current cancellation, without a temperature sensor. In the arrangement of FIG. 3, four photodiodes 54 provide an output to a first analog to digital converter ADC 56. One compensation diode 58 is provided which has an output to a second ADC 60. The output of the first analog to digital converter 56 represents a digital version of Iphoto. The output of the second analog to digital converter 60 represents Ishielded.

A one-time programmable memory OTP 62 is provided which stores the scaling factor GC. A multiplier 66 is arranged to multiply the output of the second analog to digital converter 60 and the output of the one-time programmable memory 62. The output of the multiplier 66 is provided to a subtractor 64 which subtracts the output of the multiplier from the output of the first analog to digital converter. This provides the digital version of the output current Iout.

This arrangement may provide good compensation if the photodiodes and the compensation photodiodes double their Idark values for the same increase in temperature, even if they have different dark currents at the calibration temperature.

However if the two diodes double their Idark at different increases in temperature, the system will only reasonably compensate for Idark at the temperature at which the arrangement is calibrated. At other temperatures, the compensation will not be correct, leading to an error. Typically, this compensated value is still lower than without any compensation, but the improvement is typically 2× and may not be enough to mitigate for the 100× reduction in light level due to for example the housing of the sensor.

Some embodiments may allow ambient light detectors to operate inside a device which has low transmission of light, for example an ALS hidden from a user.

Figure 4:
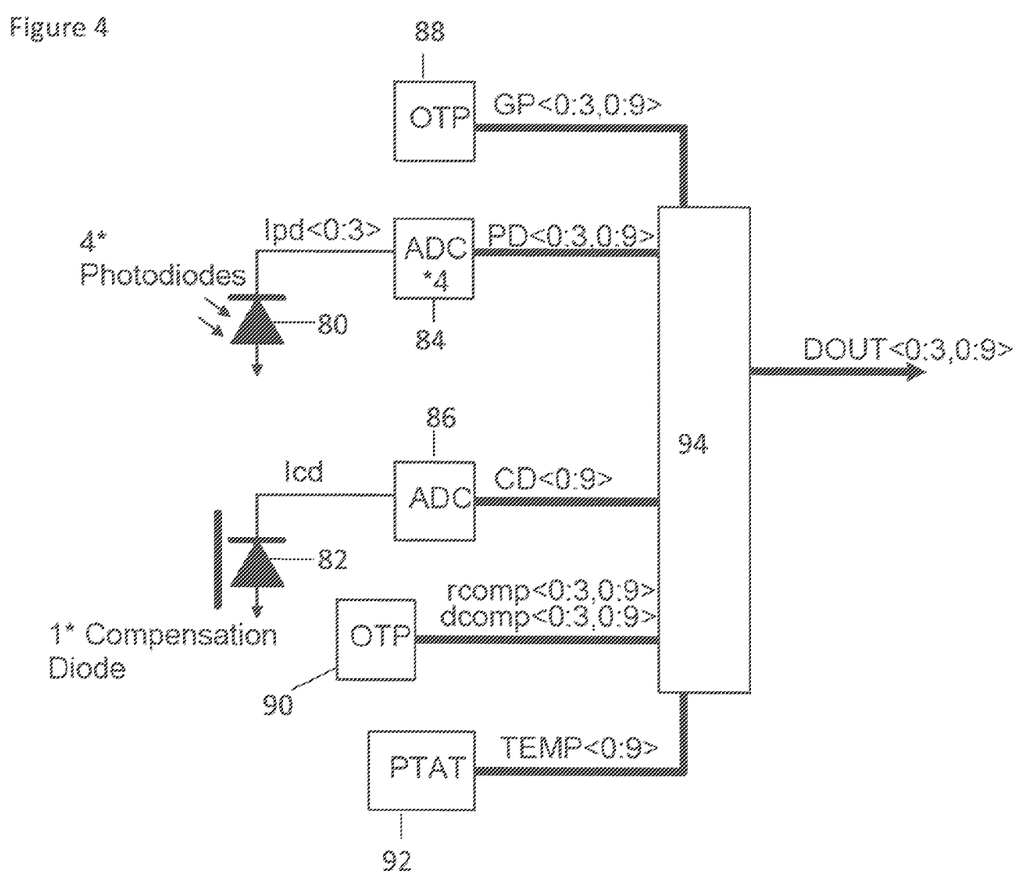
FIG. 4 shows an arrangement of an embodiment with a compensation photodiode.

Reference is made to FIG. 4 which shows an embodiment. The arrangement comprises four photodiodes 80. The four photodiodes provide a photo diode current Ipd to a first analog to digital converter 84. One compensation diode 82 is provided which provides a current Icd to a second analog to digital converter 86. A first one-time programmable memory 88 is provided which holds a compensatory factor GP. This will be discussed in more detail later. A second one-time programmable memory 90 is provided. This provides two compensation coefficients rcomp and dcomp. These will be discussed in more detail later.

A proportional to absolute temperature PTAT circuit 92 is provided. A processor 94 therefore receives the outputs of the first and second analog to digital converters, the first and second one-time programmable devices and the PTAT circuit. The processing carried out by a processor 94 will now be described in more detail.

In some embodiments, measurement and calibration of the device at two temperatures is obtained. In particular a reading for the dark current at a first temperature is obtained for the photodiodes 80 and for the compensation diode 82. This is repeated at a second temperature.

The first temperature may be around room temperature and the higher temperature may be provided at the higher end of temperature likely to be experienced by the device. One example of typical values is 20 degrees Celsius and 80 degrees Celsius. The lower temperature may be in the range of 10 degrees to 30 degrees Celsius and more preferably 15 degrees to 25 degrees Celsius. The upper temperature range may be in the range of 70 degrees to 90 degrees and more preferably in the range of 75 to 95 degrees. It should be appreciated that in some embodiments, one or other of the upper and lower temperature may fall outside the above discussed example ranges.

The compensation factors are determined and stored inside the OTPs. During operation of the circuit, the PTAT acts as temperature measurement circuitry. Using the data from the PTAT, the compensation factors and optionally the current from the compensation photodiode, the dark current can be more accurate compensated for. This may be leave a lower effective dark current enabling for example the use of ALS in lower ambient light levels even if most of the ambient light is being blocked from the sensor.

Assume that the circuit is calibrated at two temperatures, T1 and T2, and at each temperature the dark current from each diode Ipd for the photo-detector and Icd for the compensation (light shielded) diode is measured. In the calibration mode, the photo detector will be shielded from light as well. Hence, the values for the coefficients r and d for Equation 7 for each diode can be calculated:

$$rpd=IpdT1/\exp((T1\times\ln(IpdT1/IpdT2))/(T1-T2))$$

$$dpd=(T1-T2)/\ln(IpdT1/IpdT2)$$

$$rcd=IcdT1/\exp((T1\times\ln(IcdT1/IcdT2))/(T1-T2))$$

$$dcd=(T1-T2)/\ln(IcdT1/IcdT2) \quad (9)$$

(wherein ln is the natural logarithm)

For clarity, equation 9 uses the photocurrents, while the arrangement shown in FIG. 4 outputs digital values PD and CD for the photodiode signals. As the conversion from current to digital values may be linear, the values of DP and CD can equally be used in the equations.

From rpd, dpd, rcd, rpd two compensation coefficients can be calculated $$rcomp = rpd/rcd$$

$$dcomp = (dcd - dpd)/(dpd \times dcd)$$

These values for rcomp and dcomp are then stored in the OTP 90.

In some embodiments, the temperature sensor provided by the PTAT is used to record the values of T1 and T2. This may further reduce the system's error, e.g. part-part variation in the performance of the on-chip temperature sensor. However, in other embodiments, an external sensor may be used. During operation of the arrangement, the temperature sensor incorporated in the arrangement provides a value for the system temperature "T" (referred to as TEMP in FIG. 4) and this with the stored values for rcomp and dcomp is used to calculate a compensation coefficient during the operation of the arrangement:

$$GC(T) = rcomp \times exp(T \times dcomp) \quad (11)$$

$$Iout = Ipd - GC(T) \times Icd \quad (12)$$

Iout is the photocurrent where the measured photocurrent (Ipd) is compensated for dark current at the operating temperature "T".

Optionally, the photo-response non-uniformity (difference in diode's response to light) can also be compensated for:

$$Iout = GP \times (Iphoto - GC(T) \times Icomp) \quad (13)$$

GP (gain parameter) is the output from OTP 88 in FIG. 4 and is the stored compensation parameters, rcomp and dcomp.

Equation 13 thus provided the use of a compensation factor for cancelling dark current and PRNU (photo response non uniformity) during operation.

In the example of FIG. 4, there are two OTP stores with the rcomp and dcomp values. In other embodiments, there may be one store.

Figure 5:
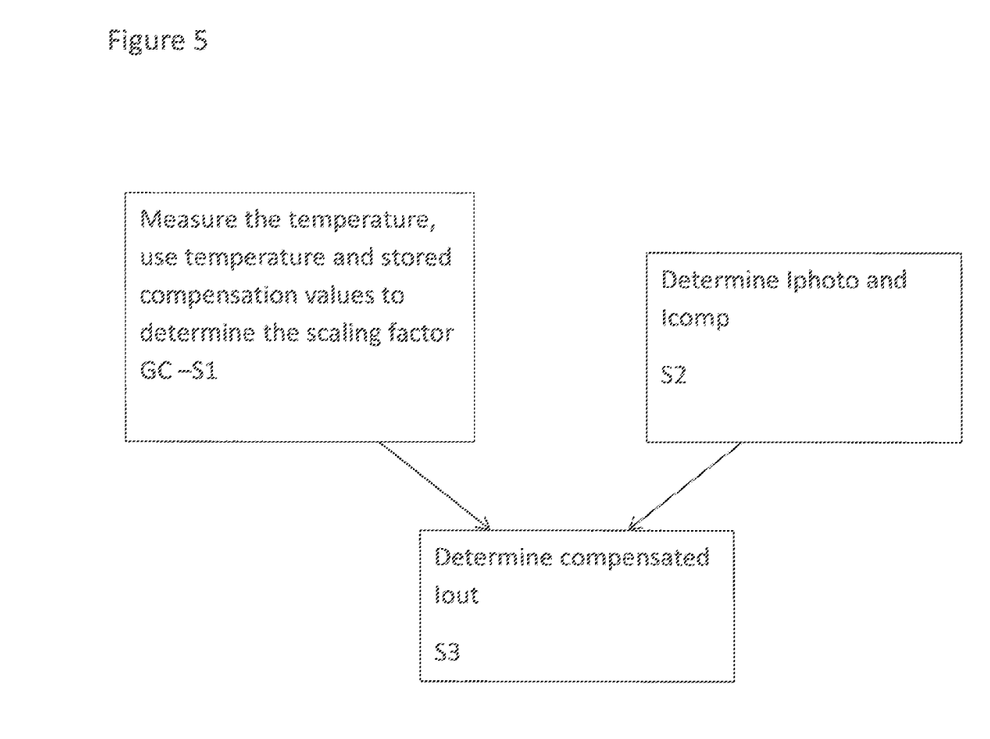
FIG. 5 shows a method of an embodiment.

Reference is made to FIG. 5 which shows a method of an embodiment. In step S1, the temperature T is determined (measured) and from that GC(T) may be determined.

In step S2, Iphoto and I comp are measured or determined.

In step S3, Iphoto, Icomp and GC(T) are used to determine Iout.

It should be appreciated that steps S1 and S2 may take place in either order or at the same time. Some devices may only have one photo-detector. However, other devices may have a plurality of detectors. For example, a device may have a plurality of detectors; e.g. one sensitive to red light, one sensitive to green light and one sensitive to blue light and optionally one sensitive to all visible light. This allows the sensor to calculate not only the levels of ambient light but also the color temperature of the light source. This can be used to correct the white balance of mega-pixel camera. The camera may be provided in a unit or device such as a laptop, phone, or tablet.

With some embodiments, it may not be necessary to have multiple compensation diodes, but use only one compensation diode. Different compensation values for each sensor may be stored.

In some embodiments, the compensation diode 82 and the associated analog to digital converter 86 may be omitted. The calibration of the device at two temperatures allows for an accurate photodiode model to be constructed using the coefficients rp and dp. In some embodiments, it may not be necessary to have a compensation diode, but use rp and dp to provide a compensation factor $$Iout = Iphoto - rcomp \times exp(T/dp) \quad (14)$$

Equation 14 shows dark current compensation without calibration diodes.

Some embodiments may use a first dark current measurement at a first temperature and a second dark current measurement at a second different temperature to provide a function, during a calibration mode. This function can be used in normal operation to compensate the measured current for the effects of dark current. The function can be implemented in any suitable manner, such as mentioned previously.

As previously described, some embodiments may be used with an ALS sensor. However, it should be appreciated that some embodiments may be used with any other sensor.

For example some embodiments may be used to provide one or more sensors for X-ray systems. In X-ray systems, lowering the effective dark-current enables lower doses of X-rays to be used. In x-ray systems, an array of photodiodes is used to detect x-rays. When an x-ray impacts on a photodiode, a photodiode reacts in the same manner as described above in relation to light. The photodiode arrangements described previously may be used in such detectors.

Some embodiments may be used in cameras.

Some embodiments may be used in image capture in higher temperature scenarios.

Some embodiments may be useful for bio-luminescence where very low levels of photons may be produced.

In some embodiments, the photodiodes may be replaced by one or more single photon avalanche detectors (SPAD). A SPAD is based on a p-n junction device biased beyond its breakdown region. A high reverse bias voltage generates a sufficiently large electric field such that a single charge carrier introduced into a depletion layer of the p-n junction device can cause a self-sustaining avalanche. This charge carrier may be released by the impact of a photon (impact ionization). The SPAD may be quenched, allowing the device to be reset to detect further photons. A SPAD also suffers from the dark current issue.

The embodiments shown have used a one-time programmable memory. It should be appreciated that in alternative embodiments, any other suitable memory may be used alternatively or additionally be provide. The memory may be provided on the same device as the photodiode or may be provided in a separate storage integrated circuit.

Some embodiments may use a look up table. The temperature may be used as an input to the look up table. The output value will be a compensation value which is associated with the input temperature.

Some embodiments may be implemented using one or more multipliers to provide the desired output.

In some embodiment, an algorithm may be provided. The algorithm will used the measured values including temperature along with the calibration values to determine the compensated current value.

In the described embodiments, some examples equations have been provided. It should be appreciated that these equations are by way of example only. Any other suitable equation or function may be used in other embodiments. For example, some embodiments may use a first dark current measurement at a first temperature and a second dark current measurement at a second different temperature to provide a function, during a calibration mode. This function can be used in normal operation to compensate the measured current for the effects of dark current at a particular temperature. The function can be implemented in any suitable manner, such as mentioned previously. The mathematical definition of the function itself can take any suitable form. The function may generally describe the behavior of the dark current with temperature over a range of temperature of interest.

The function may have a first value which is multiplied by the exponential value of the temperature divided by a second value.

The first value and/or the second value may be dependent on the dark current of the shield photo diode and the detection photodiodes at the two temperatures.

Some embodiments may have a single photo diode or sensor. Other embodiments may comprise an array of two or more photosensitive devices.

In the described embodiment, the temperature sensor is in the form of the PTAT. It should be appreciated that in alternative embodiments, the temperature sensor may take any other suitable form.

The embodiments described have used two calibration temperatures. In other embodiments, more than two temperature values can be used. This may allow a more accurate description of the dark current behavior with changes in temperature to be determined.

The photosensitive portion can take different forms, for example a photodiode, photo gate, phototransistor, charge-coupled device (CCD), charge injection device (CID), or single photon avalanche diode (SPAD), among others.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. An apparatus, comprising:
   at least one photosensitive device configured to provide an output in response to at least one photon;
   at least one shielded compensation photosensitive device configured in use to provide a dark current value; and
   a compensation circuit configured to modify said dark current value of said at least one shielded photosensitive device to provide a temperature compensated dark current value; and
   wherein said compensation circuit is further configured to provide dark current compensation for the output of said photosensitive device by processing temperature information and temperature dependent calibration information to compensate for dark current;
   wherein said temperature dependent calibration information is dependent on a calibration measurement of dark currents output from at least one of the photosensitive device and the shielded compensation photosensitive device at a first and a second, different, calibration temperatures.

2. The apparatus as claimed in claim 1, wherein said compensation circuit is further configured to use said temperature compensated dark current value as a measure of dark current in said output of said at least one photosensitive device.

3. The apparatus as claimed in claim 1, wherein said compensation circuit is further configured to subtract said temperature compensated dark current value from said output of said at least one photosensitive device.

4. The apparatus as claimed in claim 1, wherein said compensation circuit is configured to apply a function to a dark current value of said shielded photosensitive device, said function being dependent on said temperature information and said dark current of said at least one shielded photosensitive device and dark current of said at least one photosensitive device at said first and second, different, calibration temperatures.

5. The apparatus as claimed in claim 4, wherein said function has a first factor dependent on a first coefficient multiplied by an exponential function of the temperature information divided by a second coefficient.

6. The apparatus as claimed in claim 5, wherein at least one of said first and second coefficients is dependent on a dark current at the first and second calibration temperatures for said shielded photosensitive device and a dark current at the first and second calibration temperatures for said photosensitive device.

7. The apparatus as claimed in claim 6, wherein said compensation circuit is configured to store said first and second coefficients.

8. The apparatus as claimed in claim 4, wherein said compensation circuit comprises a data store configured to store said function.

9. The apparatus as claimed in claim 4, wherein said compensation circuit comprises a processor configured to execute said function.

10. The apparatus as claimed in claim 1, wherein at least one calibration temperature is in a range of 10 degrees to 30 degrees.

11. The apparatus as claimed in claim 1, wherein at least one calibration temperature is in a range of 70 degrees to 90 degrees.

12. The apparatus as claimed in claim 1, wherein said compensation circuit comprises a temperature sensing device.

13. The apparatus as claimed in claim 12, wherein said temperature sensing device comprises a proportional to absolute temperature sensor.

14. The apparatus as claimed in claim 1, wherein said photosensitive device comprises a photodiode.

15. The apparatus of claim 1, implemented as an integrated circuit.

16. The apparatus of claim 1, wherein the photosensitive device is a part of an image sensor.

17. The apparatus of claim 16, wherein the image sensor is an x-ray sensor.

18. A method comprising:
   obtaining a dark current value for at least one shielded compensation photosensitive device;
   modifying said dark current value of said at least one shielded photosensitive device to provide a temperature compensated dark current value;
   providing dark current compensation for an output of a photosensitive device by using said dark current value, temperature information and temperature dependent calibration information;
   using said temperature compensated dark current value as a measure of dark current in said output of said at least one photosensitive device; and
   calculating said temperature dependent calibration information dependent on a calibration measurement of dark currents output from at least one of the photosensitive device and the shielded compensation photosensitive device at a first and a second, different, calibration temperatures.

19. The method as claimed in claim 18, further comprising subtracting said temperature compensated dark current value from said output of said at least one photosensitive device.

20. The method as claimed in claim 18, further comprising applying a function to a dark current value of said shielded photosensitive device, said function being dependent on said temperature information and said dark current of said at least one shielded photosensitive device and dark current of said at least one photosensitive device for the first and second calibration temperatures.

21. The method as claimed in claim 20, wherein said function has a first factor dependent on a first coefficient multiplied by an exponential function of the temperature information divided by a second coefficient.

22. The method as claimed in claim 21, wherein at least one of said first and second coefficients is dependent on a dark current at said first and second, different, calibration temperatures for said shielded photosensitive device and a dark current at said first and second, different, calibration temperatures for said photosensitive device.

23. The method as claimed in claim 22, further comprising storing said first and second coefficients.

24. The method as claimed in claim 18, wherein at least one calibration temperature is in a range of 10 degrees to 30 degrees.

25. The method as claimed in claim 18, wherein at least one calibration temperature is in a range of 70 degrees to 90 degrees.

* * * * *